United States Patent
Lich et al.

(10) Patent No.: US 6,950,776 B2
(45) Date of Patent: Sep. 27, 2005

(54) METHOD FOR WEIGHTING A SEAT PROFILE

(75) Inventors: Thomas Lich, Schwaikheim (DE); Frank Mack, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/399,376

(22) PCT Filed: Sep. 15, 2001

(86) PCT No.: PCT/DE01/03553
§ 371 (c)(1),
(2), (4) Date: Sep. 8, 2003

(87) PCT Pub. No.: WO02/32716
PCT Pub. Date: Apr. 25, 2002

(65) Prior Publication Data
US 2004/0051376 A1 Mar. 18, 2004

(51) Int. Cl.⁷ .................... G01G 11/04; B60R 21/32
(52) U.S. Cl. .................. 702/173; 297/284.6; 307/10.1; 307/10.3; 340/425.5; 701/45; 701/49
(58) Field of Search ............... 702/101, 127, 702/173, 174; 177/25.11, 144; 701/49, 45; 180/273; 280/735; 297/284; 307/10.3

(56) References Cited

U.S. PATENT DOCUMENTS

| | | | | |
|---|---|---|---|---|
| 5,612,876 A | * | 3/1997 | Zeidler et al. | 701/45 |
| 5,821,633 A | | 10/1998 | Burke et al. | 307/10.1 |
| 6,088,642 A | * | 7/2000 | Finkelstein et al. | 701/49 |
| 6,203,105 B1 | * | 3/2001 | Rhodes, Jr. | 297/284.6 |
| 6,275,146 B1 | * | 8/2001 | Kithil et al. | 340/425.5 |
| 6,369,459 B1 | * | 4/2002 | Stevens | 307/10.3 |

FOREIGN PATENT DOCUMENTS

| | | |
|---|---|---|
| DE | 196 30 260 | 1/1997 |
| EP | 1 000 797 | 5/2000 |
| WO | WO 98 14345 | 4/1998 |
| WO | WO 99 24285 | 5/1999 |

OTHER PUBLICATIONS

SAE Technical Paper Series, *Description of Proposed System*, Society of Automotive Engineers, Warrendale, PA, 1999, pp. 1439–1443.

Billen et al., *Occupant Classification System for Smart Restrained Systems*, SAE paper, 1999, p. 33–38.

* cited by examiner

Primary Examiner—John Barlow
Assistant Examiner—John Le
(74) Attorney, Agent, or Firm—Kenyon & Kenyon

(57) ABSTRACT

A method is proposed for evaluating a seat profile, in which a quality parameter with which the profile is evaluated, is first weighted with a dynamic factor. This dynamic factor is determined with the aid of the seat profile and/or at least one center of gravity. The seat profile characterizes the continuous changes in sensors of a sensor matrix, whereas, for the center of gravity, position changes in the at least one center of gravity are continuously monitored. The dynamic factor is then determined from a weighted sum of the changes in the sensors of the sensor matrix and the position changes of the at least one center of gravity. If appropriate, a holding function may be applied to the dynamic factor.

6 Claims, 2 Drawing Sheets

METHOD FOR WEIGHTING A SEAT PROFILE

FIELD OF THE INVENTION

The present invention is directed to a method for evaluating a seat profile.

BACKGROUND INFORMATION

In K. Billen, L. Federspiel, P. Schockmehl, B. Serban and W. Scherrel: Occupant Classification System for Smart Restrained Systems, SAE paper, 1999, page 33 through page 38, a seat mat having a sensor matrix is described, the sensor matrix being used for the continuous generation of a seat profile of different persons and objects. Features determined from the seat profile are used for occupant classification.

German Published Patent Application No.196 30 260 describes a system for detecting the presence of a live person, especially for detecting the occupation mode of a vehicle seat. In the process, an oscillation analysis is implemented, namely to determine in which frequency ranges an object or a person leads to signals.

SUMMARY OF THE INVENTION

In contrast, the method according to the present invention for evaluating a seat profile has the advantage over the related art that the effect of dynamic processes, such as cornering, the boarding behavior at an incline and rapid movements of an object on a vehicle seat, are taken into account in the evaluation of a seat profile recorded with the aid of a sensor matrix. This is a cost-effective design approach requiring no additional investment in hardware, which provides improved information about the seat profile and allows better responses of restraint systems or of other systems to which these data are provided.

Moreover, it is advantageous that static objects, such as a child-safety seat, are recognized by evaluating the dynamic response and, in this context, by the dynamic factor. Furthermore, it is advantageous that two parameters are used for calculating the dynamic factor, thereby increasing the reliability of the computed dynamic factor.

Advantageous improvements of the method for evaluating a seat profile indicated in the independent claim, are rendered possible by measures and further refinements specified in the dependent claims.

It is particularly advantageous that the continuous changes in the sensors are used as the changes in the seat profile. It is particularly advantageous if the sensor values are compared to at least one threshold value, so that changes in the sensors may be detected.

Moreover, it is advantageous that changes in the center of gravity are monitored through a position change in the at least one center of gravity. The center of gravity is calculated in the manner generally known from physics.

Furthermore, it is advantageous that the dynamic factor is calculated from a weighted sum of the changes in the sensors of the sensor matrix and from the positional changes of the at least one center of gravity. In this way, these two features are taken into account, so that one feature may possibly compensate for the influence of the other feature. The weighting factors are previously known and have been developed from experimental studies.

Moreover, it is advantageous that the method according to the present invention includes a holding function, thereby making short-term, high dynamic factors able to be measured by setting a decay function.

Furthermore, it is advantageous that a device is provided for implementing the method according to the present invention, the device including a sensor matrix in a seat mat in a vehicle seat, an analog-digital converter for digitizing the sensor values, a memory for buffer-storing data and a processor for computing the dynamic factor.

BRIEF DESCRIPTION OF THE DRAWING

Exemplary embodiments of the present invention are shown in the drawing and are explained in greater detail in the following description.

The Figures show.

SPECIFICATION

The use of a sensor matrix in a seat mat in a vehicle seat is a means of implementing an occupant classification. The occupant classification is carried out either with the aid of the seat profile and/or a weight estimate. Both the size of the seat profile as well as structures resulting from the seat profile are able to be evaluated in the seat profile. An example of these structures is the ischial tuberosity spacing, which allows conclusions as to the weight of the occupant.

The occupant classification is required for the selective activation of restraint systems, such as a multi-stage air bag, thereby providing optimal protection of the passengers and minimizing injuries caused by the restraint system. A multi-stage air bag allows a stage-wise switching of the restraining force at which the air bag is inflated, so that the air bag may be adjusted in accordance with the weight of the person. In a continuous recording of the seat profile, dynamic effects, such as rapid cornering, the boarding behavior at hills or other inclines, or also at downhill grades, as well as rapid movements of a person occupying the seat, lead to short-term changes in the seat profile. These changes are not necessarily useful for adjusting the restraint system, since such seat profiles, when considered in isolation, give a wrong impression of the object present in the vehicle seat. The seat profile is usually weighted with a quality parameter, so that poor seat profiles may be rejected and earlier acquired, better seat profiles may continue to be used. In the process, the quality parameter is compared to a predefined threshold value in order to decide whether or not the given seat profile is usable.

According to the present invention, this quality parameter is weighted with a dynamic factor, so that dynamic processes may be entered into the evaluation of the seat profile as well. The dynamic factor is first calculated with the aid of the seat profile and/or at least one center of gravity. Changes in the sensors of the sensor matrix are continuously monitored here for the seat profile. For the center of gravity, position changes in the at least one center of gravity are continuously monitored. The dynamic factor is calculated by forming a weighted sum from the changes in the sensors and the position changes in the at least one center of gravity, the weighting factors having been previously established by way of experiments. High dynamic factors of short duration are able to be recorded by applying a holding function.

Figure 1:
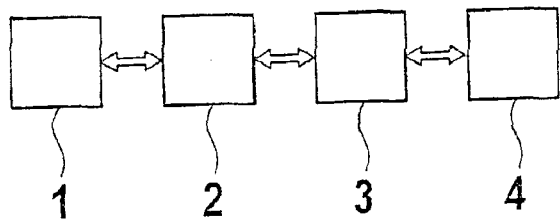
FIG. 1 a block diagram of the device according to the present invention.

FIG. 1 shows the device according to the present invention as a block diagram. A sensor matrix 1 is connected to a control device 2 for sensor matrix 1 via a data input/output. Via a second data input/output, control device 2 for sensor matrix 1 is connected to a control device 3 for a restraint system 4. Control device 3 for restraint system 4 is connected to restraint system 4 via a second data input/output. Here, the connections may also be realized via bus lines, and control device 2 for sensor matrix 1 be connected to additional control devices and vehicle systems as well, thereby making its data available to these systems.

Pressure sensors are located in a matrix in sensor matrix 1. As the pressure increases, the pressure sensors show a decreasing resistance. Sensor matrix 1 is measured with respect to the resistance in a column- and line-manner, thereby making it possible to determine the resistances of the individual pressure sensors and the compressive load. This measurement is implemented by measuring currents. The individual pressure sensors are initially subjected to electric potentials at the columns and lines in such a way that no currents flow. By control device 2 changing the electric potentials, it is then possible for currents to flow through a respective pressure sensor. In this way, processor 3 is able to determine the resistance value for the respective pressure sensor. The individual pressure sensors are interrogated in a sequential manner by the change in the electric potentials at the lines and columns, so that the current values reach control device 2 one after another via a line. These current values are digitized by control device 2. On this basis, the control device first calculates the resistance values, using them to generate the seat profile of sensor matrix 1. With the aid of the resistance values it is then possible to determine the center of gravity of the seat profile, since the center of gravity is located where the lowest resistance values are measured, i.e., where the highest pressure has been exerted on the sensor matrix. Control device 2 determines the center of gravity using the known formula for calculating the center of gravity, thereby providing a position indicating the center of gravity. The acquisition of the seat profile and of the positional changes in the center of gravity is implemented on a continuous basis.

Figure 2:
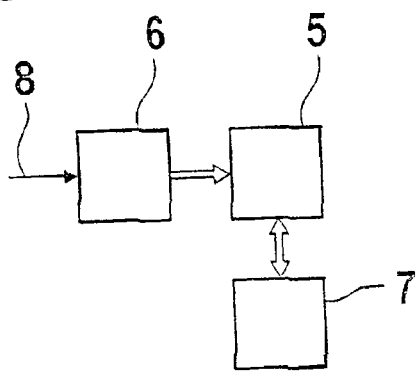
FIG. 2 a block diagram of a control device for a sensor matrix.

FIG. 2 shows control device 2 as a block diagram. Via an input 8 of sensor matrix 1, an analog-digital converter 6 receives the measured values, i.e., the current values, from the individual sensors. Analog-digital converter 6 digitizes these measured values, which are then supplied to a processor 5 in the form of digital data flow. From these data, processor 5 calculates the center of gravity and the changes in the individual sensors. By a comparison with gravitational center data stored in a memory 7, which is connected to processor 5 via a data input/output, the changes in the center of gravity are able to be recorded as a function of time. The positions of the gravitational center, thus, are continuously stored. The change in the center of gravity is converted into a percentage in that the positional change, in millimeters, is assigned a percentage, using the sum of the amounts from the changes in the x- and y-direction. However, it is also possible to calculate the actual position change by forming the square root of the sum of the squares of the changes in the x- and y-direction.

Figure 3:
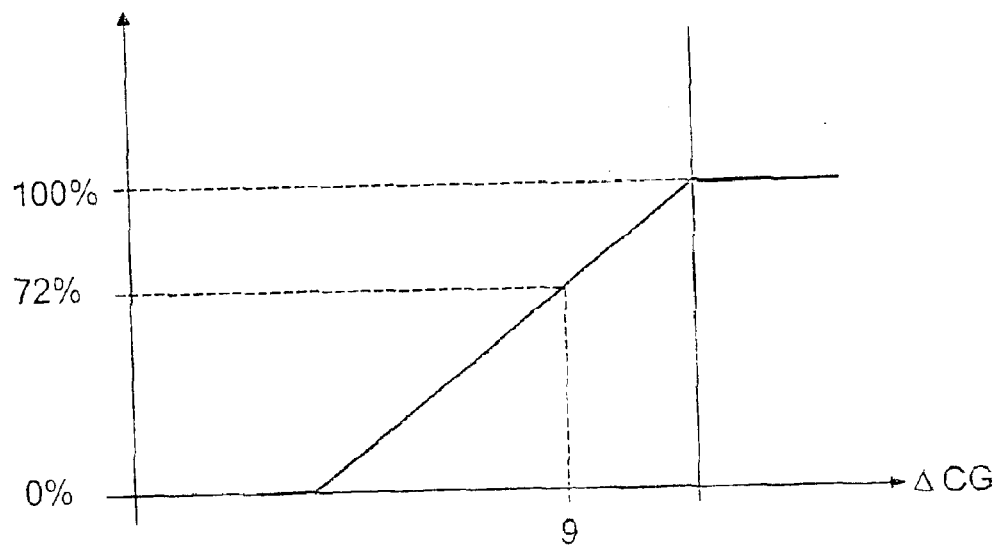
FIG. 3 the evaluation of the change in the center of gravity.

FIG. 3 shows a diagram in which the changes in the center of gravity $\Delta CG$ are plotted on the abscissa and a percentage change in the gravitational center is plotted on the ordinate. The absolute changes in the center of gravity on the abscissa are related to the percentage changes of the center of gravity on the ordinate via a ramp. In this case, a gravitational-center change of 9 was determined between the instantaneous center of gravity and the preceding center of gravity, which was converted into a gravitational-center change of 72%. The value of 72 is then entered into the calculation of the sum for the dynamics factor, a weighting factor, which is stored in memory 7, being applied to this value of 72.

From the changes in the measured sensor values, processor 5 calculates the second portion for the dynamic factor. In doing so, the measured value of the individual sensors is compared to a predefined threshold value stored in memory 7, in order to determine whether or not there was a change in the sensor. Alternatively, it is also possible in each case to compare the absolute measured sensor values, so as to evaluate these changes. The changes are then added up and introduced into the calculation of the dynamic factor as the second summand.

The following equation illustrates by way of example how the dynamics factor is calculated.

$$\text{Dynamic factor} = \frac{dynCG \cdot A + dyn\ \text{profile} \cdot B}{A + B}$$

In this context, dynCG represents the value that resulted from the change in the center of gravity; A refers to the weighting factor for the gravitational-center change; dyn profile is the value resulting from the change in the sensors; and B is the weighting factor for the change in the sensors.

Figure 4:
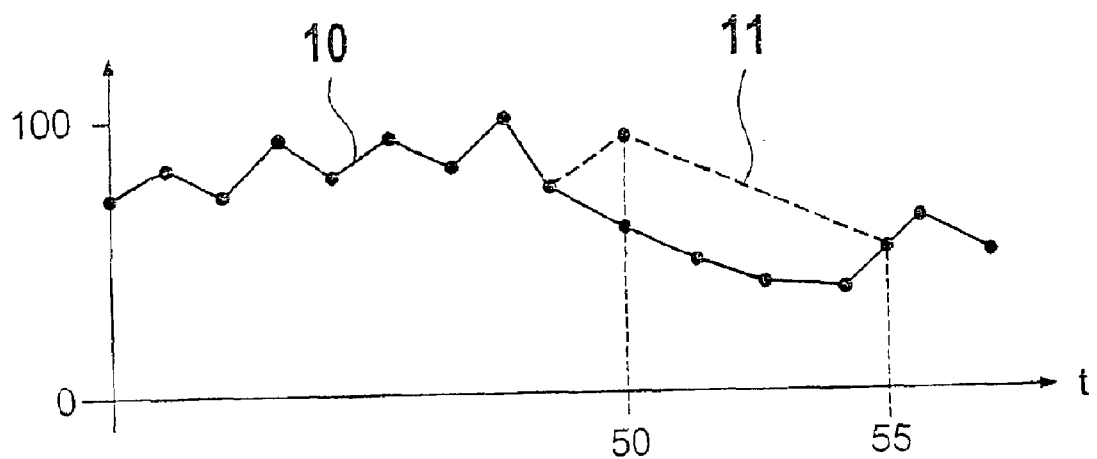
FIG. 4 the applications of the holding function.

FIG. 4 shows the application of the holding function to the calculation of the dynamic factor, as a function of time. A function 10 in the dynamic factor-time diagram indicates the dynamic factors determined at consecutive points in time. At time 50, an alternative curve of the dynamic factor function is represented by the dotted line. Here, the dynamics factor ascertained at time 50 is higher than the previous value. In this case, function 11, starting out from the dynamic factor at time 50, decays with a holding function 11 until holding function 11 again intersects with the determined dynamic factors, which is attained at time 55. In this way, steep jumps in the dynamic factors as a function of time are avoided.

The holding function has the purpose of setting a calculated dynamic factor into a temporal relation to the preceding dynamic response. In the process, the dynamic factor at time t is compared to the dynamic factor at time t-1. If the dynamic response has increased, the instantaneous value is used as the basis for a decay function. The decay function may be realized in the following way:

$$\text{dynamic factor}(t) = \text{dynamic factor}(t-1) - \frac{\text{dynamic factor}(t-1) \cdot \text{numerator}}{C}$$

Variable C, which is stored in the memory, provides the value indicating how strongly the decay characteristic lasts. The counter indicates how often the instantaneous dynamic factor is lower than the basic value used for the decay function.

Figure 5:
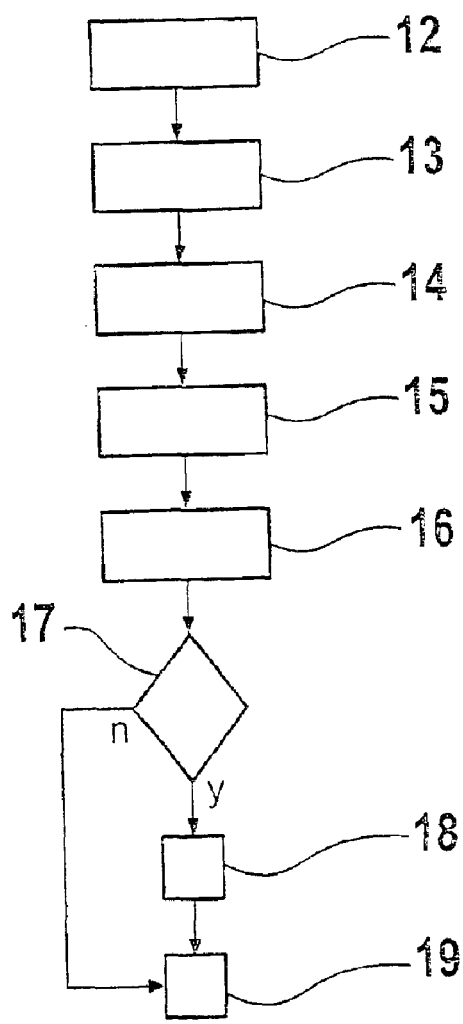
FIG. 5 a flow chart of the method according to the present invention.

In FIG. 5, the method according to the present invention is represented as a flow chart. In method step 12, the sensors of sensor matrix 1 record the measured values, which are digitized by analog-digital converter 6 and received by processor 5. In method step 13, processor 5 then first calculates the center of gravity, and, in method step 14, processor 5 determines the changes in the center of gravity in order to weight these changes in the center of gravity by a percentage, as illustrated in FIG. 3. In method step 15, the changes in the sensors are then determined either with the aid of a threshold value or the absolute changes in the measured values. These changes are evaluated as well. In method step 16, the dynamic factor is determined from the weighted sum of the changes in the gravitational center and the changes in the seat profile. In method step 17, it is determined whether the holding function is to be applied to the dynamic factor. If this is the case, method step 18 is implemented, as illustrated above. If not, it is immediately continued with method step 19 in that the quality parameter, which is used to evaluate the seat profile, is now first weighted with the dynamic factor. The method according to the present invention runs continuously.

The sequence of calculating the center of gravity and calculating the change in the sensor values may also be reversed. Furthermore, it is possible to use either only the gravitational-center change or only the change in the sensors.

What is claimed is:

1. A method for weighting a seat profile, comprising:
   determining the seat profile in accordance with a seat matrix in a seat mat in a vehicle seat;
   weighting the seat profile with a quality parameter;
   determining a dynamic factor on the basis of at least one of a change in the seat profile and a change in at least one center of gravity determined for the seat profile;
   evaluating the quality parameter with the dynamic factor; and
   applying a holding function to the dynamic factor in accordance with a decay function.

2. The method as recited in claim 1, further comprising:
   continuously monitoring changes in sensors of the sensor matrix for the seat profile in order to determine the dynamic factor.

3. The method as recited in claim 2, further comprising:
   determining the dynamic factor from a weighted sum of the changes in the sensors of the sensor matrix and a position change of the at least one center of gravity.

4. The method as recited in claim 1, further comprising:
   continuously monitoring a position change of the at least one center of gravity in order to determine the dynamic factor.

5. A device for weighting a seat profile, comprising:
   a sensor matrix arranged in a seat mat of a vehicle seat;
   an analog-digital converter for digitizing a sensor value produced by the sensor matrix;
   a memory for buffer-storing data; and
   a processor for calculating a dynamic factor;
   wherein a holding function is applied to the dynamic factor in accordance with a decay function.

6. The device for weighting a seat profile as recited in claim 5,
   wherein the dynamic factor is calculated on the basis of at least one of a change in the seat profile and a change in at least one center of gravity determined for the seat profile.

* * * * *

UNITED STATES PATENT AND TRADEMARK OFFICE
CERTIFICATE OF CORRECTION

| | | |
|---|---|---|
| PATENT NO. | : 6,950,776 B2 | Page 1 of 2 |
| APPLICATION NO. | : 10/399376 | |
| DATED | : September 27, 2005 | |
| INVENTOR(S) | : Thomas Lich et al. | |

It is certified that error appears in the above-identified patent and that said Letters Patent is hereby corrected as shown below:

Column 1, lines 44-47, delete "Advantageous improvements…the dependent claims."

Column 2, lines 11-14, delete "Exemplary embodiments...The figures show:"

Column 2, line 16, change "FIG. 1 a block diagram" to --FIG. 1 shows a block diagram--

Column 2, line 18, change "FIG. 2 a block diagram" to --FIG. 2 shows a block diagram--

Column 2, line 20, change "FIG. 3 the evaluation" to --FIG. 3 shows the evaluation--

Column 2, line 22, change "FIG. 4 the applications" to --FIG. 4 shows the applications--

Column 2, line 23, change "FIG. 5 a flowchart" to --FIG. 5 shows a flowchart--

Column 2, line 27, change "SPECIFICATION" to --DETAILED DESCRIPTION--

Column 2, line 36, change "classification is required for" to --classification is for--

UNITED STATES PATENT AND TRADEMARK OFFICE
CERTIFICATE OF CORRECTION

PATENT NO. : 6,950,776 B2
APPLICATION NO. : 10/399376
DATED : September 7, 2005
INVENTOR(S) : Thomas Lich et al.

It is certified that error appears in the above-identified patent and that said Letters Patent is hereby corrected as shown below:

Drawing Sheet 2, Figure 5, include the following text inside boxes 12 to 19:
Box 12 -- Record the measured values --
Box 13 -- Calculate center of gravity --
Box 14 -- Determine the changes in the center of gravity --
Box 15 -- Evaluate the change values --
Box 16 -- Determine dynamic factor --
Box 17 -- Apply holding function to dynamic factor? --
Box 18 -- Apply holding function --
Box 19 -- Weight quality parameter with dynamic factor --

Signed and Sealed this

Twenty-second Day of August, 2006

JON W. DUDAS
*Director of the United States Patent and Trademark Office*